US011217088B2

(12) United States Patent
Cobb et al.

(10) Patent No.: US 11,217,088 B2
(45) Date of Patent: Jan. 4, 2022

(54) ALERT VOLUME NORMALIZATION IN A VIDEO SURVEILLANCE SYSTEM

(71) Applicant: Intellective Ai, Inc., Dallas, TX (US)

(72) Inventors: Wesley Kenneth Cobb, The Woodlands, TX (US); Kishor Adinath Saitwal, Houston, TX (US)

(73) Assignee: Intellective Ai, Inc., Dallas, TX (US)

( * ) Notice: Subject to any disclaimer, the term of this patent is extended or adjusted under 35 U.S.C. 154(b) by 309 days.

(21) Appl. No.: 15/938,759

(22) Filed: Mar. 28, 2018

(65) Prior Publication Data

US 2019/0005806 A1    Jan. 3, 2019

Related U.S. Application Data

(63) Continuation of application No. 15/163,461, filed on May 24, 2016, now abandoned, which is a
(Continued)

(51) Int. Cl.
*G06N 20/00* (2019.01)
*G08B 29/18* (2006.01)
(Continued)

(52) U.S. Cl.
CPC ....... *G08B 29/185* (2013.01); *G06K 9/00369* (2013.01); *G06K 9/00771* (2013.01);
(Continued)

(58) Field of Classification Search
CPC .......... G06N 5/025; G06N 5/04; G06N 5/022; G06Q 10/10; G06Q 10/06
(Continued)

(56) References Cited

U.S. PATENT DOCUMENTS

| 4,679,077 A | 7/1987 | Yuasa et al. |
| 5,113,507 A | 5/1992 | Jaeckel |
| (Continued) | | |

FOREIGN PATENT DOCUMENTS

| CN | 101557506 A | 10/2009 |
| CN | 101901334 A | 12/2010 |
| (Continued) | | |

OTHER PUBLICATIONS

Ertöz et al.—"Detection and Summarization of Novel Network Attacks Using Data Mining"—2004—http://citeseerx.ist.psu.edu/viewdoc/summary?doi=10.1.1.115.374 (Year: 2004).*
(Continued)

*Primary Examiner* — Viker A Lamardo
(74) *Attorney, Agent, or Firm* — Cooley LLP

(57) ABSTRACT

Techniques are disclosed for normalizing and publishing alerts using a behavioral recognition-based video surveillance system configured with an alert normalization module. Certain embodiments allow a user of the behavioral recognition system to provide the normalization module with a set of relative weights for alert types and a maximum publication value. Using these values, the normalization module evaluates an alert and determines whether its rareness value exceed a threshold. Upon determining that the alert exceeds the threshold, the module normalizes and publishes the alert.

21 Claims, 6 Drawing Sheets

Related U.S. Application Data continuation of application No. 13/836,730, filed on Mar. 15, 2013, now Pat. No. 9,349,275.

(60) Provisional application No. 61/611,284, filed on Mar. 15, 2012.

(51) Int. Cl.

| | | |
|---|---|---|
| *G08B 23/00* | (2006.01) | |
| *G06K 9/00* | (2006.01) | |
| *G06K 9/62* | (2006.01) | |
| *H04N 7/00* | (2011.01) | |
| *G06K 9/32* | (2006.01) | |
| *G06K 9/52* | (2006.01) | |
| *G08B 21/18* | (2006.01) | |
| *G08B 13/196* | (2006.01) | |

(52) U.S. Cl.
CPC ....... *G06K 9/00778* (2013.01); *G06K 9/3241* (2013.01); *G06K 9/52* (2013.01); *G06K 9/6254* (2013.01); *G06N 20/00* (2019.01); *G08B 21/182* (2013.01); *G08B 23/00* (2013.01); *H04N 7/002* (2013.01); *G08B 13/19608* (2013.01)

(58) Field of Classification Search
USPC ........................................................ 706/47
See application file for complete search history.

(56) References Cited

U.S. PATENT DOCUMENTS

| | | | |
|---|---|---|---|
| 5,748,775 A | 5/1998 | Tsuchikawa et al. | |
| 5,751,378 A | 5/1998 | Chen et al. | |
| 5,969,755 A | 10/1999 | Courtney | |
| 6,088,468 A | 7/2000 | Ito et al. | |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,795,567 B1 | 9/2004 | Cham et al. | |
| 6,856,249 B2 | 2/2005 | Strubbe et al. | |
| 6,940,998 B2 | 9/2005 | Garoutte | |
| 7,076,102 B2 | 7/2006 | Lin et al. | |
| 7,133,537 B1 | 11/2006 | Reld | |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,825,954 B2 | 11/2010 | Zhang et al. | |
| 7,868,912 B2 | 1/2011 | Venetianer et al. | |
| 8,078,233 B1 | 12/2011 | Sennett et al. | |
| 8,126,833 B2* | 2/2012 | Cobb ................. | G06K 9/00771 706/46 |
| 8,167,430 B2 | 5/2012 | Cobb et al. | |
| 8,169,481 B2 | 5/2012 | Ozdemir et al. | |
| 8,180,712 B2 | 5/2012 | Nelson et al. | |
| 8,218,818 B2 | 7/2012 | Cobb et al. | |
| 8,280,153 B2 | 10/2012 | Cobb et al. | |
| 8,285,060 B2 | 10/2012 | Cobb et al. | |
| 8,300,924 B2 | 10/2012 | Eaton et al. | |
| 8,340,352 B2 | 12/2012 | Cobb et al. | |
| 8,379,085 B2 | 2/2013 | Cobb et al. | |
| 8,407,625 B2 | 3/2013 | Cohen et al. | |
| 8,411,935 B2 | 4/2013 | Eaton et al. | |
| 8,493,409 B2 | 7/2013 | Cobb et al. | |
| 8,589,315 B2* | 11/2013 | Medasani ............ | G06K 9/6292 706/1 |
| 8,649,594 B1* | 2/2014 | Hua ................... | G06K 9/00771 382/159 |
| 8,719,198 B2 | 5/2014 | Zheng et al. | |
| 9,208,675 B2 | 12/2015 | Xu et al. | |
| 9,349,275 B2 | 5/2016 | Saitwal et al. | |
| 10,096,235 B2 | 10/2018 | Cobb et al. | |
| 2003/0107650 A1 | 6/2003 | Colmenarez et al. | |
| 2003/0228058 A1 | 12/2003 | Xie et al. | |
| 2004/0151342 A1 | 8/2004 | Venetianer et al. | |
| 2004/0246123 A1 | 12/2004 | Kawabe et al. | |
| 2005/0001759 A1 | 1/2005 | Khosla | |
| 2005/0105765 A1 | 5/2005 | Han et al. | |
| 2005/0162515 A1 | 7/2005 | Venetianer et al. | |
| 2005/0240629 A1 | 10/2005 | Gu et al. | |
| 2005/0281435 A1 | 12/2005 | Aggarwal | |
| 2006/0018516 A1 | 1/2006 | Masoud et al. | |
| 2006/0056655 A1 | 3/2006 | Wen et al. | |
| 2006/0085369 A1 | 4/2006 | Bauer et al. | |
| 2006/0138338 A1 | 6/2006 | Tezuka et al. | |
| 2006/0165386 A1 | 7/2006 | Garoutte | |
| 2006/0190419 A1 | 8/2006 | Bunn et al. | |
| 2006/0193516 A1 | 8/2006 | Toyama et al. | |
| 2006/0222206 A1 | 10/2006 | Garoutte | |
| 2006/0227997 A1 | 10/2006 | Au et al. | |
| 2007/0070190 A1 | 3/2007 | Yin et al. | |
| 2007/0250898 A1 | 10/2007 | Scanlon et al. | |
| 2008/0002856 A1 | 1/2008 | Ma et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0247599 A1 | 10/2008 | Porikli et al. | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0087027 A1 | 4/2009 | Eaton et al. | |
| 2009/0210367 A1 | 8/2009 | Armstrong et al. | |
| 2009/0210373 A1* | 8/2009 | Yu ........................ | A61B 5/1128 706/47 |
| 2009/0222388 A1* | 9/2009 | Hua ................... | G06K 9/00778 706/12 |
| 2009/0297023 A1 | 12/2009 | Lipton et al. | |
| 2009/0324107 A1 | 12/2009 | Walch | |
| 2010/0063949 A1* | 3/2010 | Eaton ................. | G06K 9/00771 706/14 |
| 2010/0150471 A1 | 6/2010 | Cobb et al. | |
| 2010/0208063 A1 | 8/2010 | Lee et al. | |
| 2010/0321183 A1* | 12/2010 | Donovan ......... | G08B 13/19645 340/540 |
| 2010/0322516 A1 | 12/2010 | Xu et al. | |
| 2011/0043631 A1 | 2/2011 | Marman et al. | |
| 2011/0052068 A1 | 3/2011 | Cobb et al. | |
| 2011/0064267 A1 | 3/2011 | Cobb et al. | |
| 2011/0134245 A1 | 6/2011 | Khizhnichenko | |
| 2011/0211070 A1 | 9/2011 | Shu et al. | |
| 2011/0320389 A1* | 12/2011 | Donovan ........... | H04N 5/23229 706/12 |
| 2012/0063641 A1* | 3/2012 | Venkatesh .......... | G06K 9/00771 382/103 |
| 2012/0140042 A1 | 6/2012 | Albertson et al. | |
| 2013/0159221 A1 | 6/2013 | Thompson | |
| 2013/0241730 A1 | 9/2013 | Saitwal et al. | |
| 2013/0242093 A1 | 9/2013 | Cobb et al. | |
| 2013/0243252 A1 | 9/2013 | Xu et al. | |
| 2016/0267777 A1 | 9/2016 | Cobb et al. | |
| 2019/0188998 A1 | 6/2019 | Cobb et al. | |

FOREIGN PATENT DOCUMENTS

| | | |
|---|---|---|
| EP | 0749098 A2 | 12/1996 |
| KR | 10-2011-0133476 | 12/2011 |
| WO | WO 2009/049314 | 4/2009 |
| WO | WO 2010/055205 | 5/2010 |
| WO | WO 2010/111748 | 10/2010 |

OTHER PUBLICATIONS

Ertoz et al.—"Detection of Novel Network Attacks Using Data Mining"—2003—http://citeseerx.ist.psu.edu/viewdoc/summary?doi=10.1.1.74.8739&rank=1 (Year: 2003).*

(56) References Cited

OTHER PUBLICATIONS

Extended European Search Report for European Application No. 13760552.3, dated May 18, 2016, 9 pages.
Extended European Search Report for European Application No. 13760772.7, dated Sep. 26, 2016, 8 pages.
First Office Action for Chinese Application No. 201380019203.9, dated Feb. 16, 2016, 19 pages.
International Search Report and Written Opinion for International Application No. PCT/US2013/031977, dated Jun. 28, 2013, 8 pages.
International Search Report and Written Opinion for International Application No. PCT/US2013/032075, dated Jun. 28, 2013, 9 pages.
Connell, J et al., "Detection and Tracking in the IBM PeopleVision System," IEEE ICME, Jun. 2004, pp. 1-4.
Grabner, H. et al., "On-line Boosting and Vision," IEEE Conference on Computer Vision and Pattern Recognition (CVPR), 2006, vol. 1, pp. 260-267.
Haritaoglu, I. et al., "Ghost: A Human Body Part Labeling System Using Silhouettes," 14th Annual International Conference on Pattern Recognition, Aug. 1998, pp. 77-82.
Nock, R. et al., "Statistical Region Merging," IEEE Transactions on Pattern Analysis and Machine Intelligence, Nov. 2004, 26(11):1452-1458.
Apewokin et al., "Multimodal Mean Adaptive Backgrounding for Embedded Real-Time Video Surveillance," Jun. 2007, IEEE, 6 pages, Minneapolis, MN US.
Elgammal, A. et al., "Non-parametric Model for Background Subtraction," Computer Vision Laboratory, University of Maryland, Jun. 2000, 18 pages, College Park, Maryland, US.
Haritaoglu et al., "W4: Real-Time Surveillance of People and Their Activities," IEEE Transactions on Pattern Analysis and Machine Intelligence, Aug. 2000, vol. 22, No. 8, pp. 809-830.
Ivanov et al., "Video Surveillance of Interactions," MIT Media Laboratory, Cambridge, MA, Jul. 1999, 8 pages, Fort Collins, Colorado, US.
Stauffer, C. et al., "Adaptive background mixture models for real-time tracking," Proceedings IEEE Conference on Computer Vision and Pattern Recognition, 1999, pp. 246-252.
Kanerva, P., "Sparse Distributed memory and Related Models," M.H. Hassoun, ed., Associative Neural Memories: Theory and Implementation, 1993, pp. 50-76. New York, Oxford University Press.
Senior et al., "Appearance Models for Occlusion Handling," IBM T.J. Watson Research Center, 2001, 8 pages, Yorktown, Heights, NY US.
Stauffer, C. et al., "Learning Patterns of Activity Using Real-Time Tracking," IEEE Transactions on Pattern Analysis and Machine Intelligence (TPAMI), Aug. 2000, vol. 22, Issue 8, pp. 747-757.
Wiliem, A. et al., "Detecting Uncommon Trajectories," Digital Image Computing: Techniques and Applications, 2008, pp. 398-404.
Kardar, M., "Random Walks," [Online], Retrieved from the Internet: <http://www.mit.edu/~kardar/teaching/projects/chemotaxis(AndreaSchmidt)/random.htm>, Mar. 28, 2008, 4 pages.
Kardar, M., "More About Random Walks," [Online], Retrieved from the Internet: <http://www.mit.edu/~kardar/teaching/projects/chemotaxis(AndreaSchmidt)/more_random.htm>, Mar. 28, 2008, 4 pages.

* cited by examiner ical patent application Ser. No. 15/163,461, filed on May 24,
ALERT VOLUME NORMALIZATION IN A VIDEO SURVEILLANCE SYSTEM

CROSS-REFERENCE TO RELATED APPLICATIONS

This application is a continuation of co-pending U.S. patent application Ser. No. 15/163,461, filed on May 24, 2016, which in turn is a continuation of U.S. patent application Ser. No. 13/836,730, filed on Mar. 15, 2013, granted as U.S. Pat. No. 9,349,275, and which in turn claims priority to and benefit of U.S. Provisional Patent Application Ser. No. 61/611,284, filed Mar. 15, 2012; the entire contents of each of aforementioned applications is herein expressly incorporated by reference for all purposes.

FIELD

Embodiments disclosed herein generally relate to techniques for reporting anomalous behavior to users of a behavioral recognition-based video surveillance system. More specifically, disclosed embodiments provide a framework for normalizing the number of alerts generated for multiple disjoint alert types.

BACKGROUND

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine when an object has engaged in certain predefined behaviors. For example, the system may include definitions used to recognize the occurrence of a number of predefined events, e.g., the system may evaluate the appearance of an object classified as depicting a car (a vehicle-appear event) coming to a stop over a number of frames (a vehicle-stop event). Thereafter, a new foreground object may appear and be classified as a person (a person-appear event) and the person then walks out of frame (a person-disappear event). Further, the system may be able to recognize the combination of the first two events as a "parking-event."

However, such surveillance systems typically require that the objects and/or behaviors which may be recognized by the system be defined in advance. Thus, in practice, these systems rely on predefined definitions for objects and/or behaviors to evaluate a video sequence. Unless the underlying system includes a description for a particular object or behavior, the system is generally incapable of recognizing that behavior (or at least instances of the pattern describing the particular object or behavior). More generally, such systems rely on predefined rules and static patterns and are thus often unable to dynamically identify objects, events, behaviors, or patterns, much less even classify them as either normal or anomalous.

Moreover, end users of these rules-based surveillance systems typically specify events which should result in an alert. However, this poses a problem in practice because a typical rule-based surveillance system generates, on average, thousands of alerts per day and per camera, and a user presented with a numerous amount of alerts becomes unable to discern which alerts are of high importance. Thus, these rules-based systems are of limited usefulness with regard to notifying a user of important security alerts.

SUMMARY

One embodiment of the invention provides a method for normalizing and publishing alerts using a behavioral recognition system configured with normalization module. This method may generally include receiving an alert having a type and an original rareness value and converting the original rareness value to an alert percentile value. This method may also include normalizing and publishing the alert upon determining that the alert percentile value is greater than an alert percentile threshold.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features, advantages, and objects of the present disclosure are attained and can be understood in detail, a more particular description, briefly summarized above, may be had by reference to the embodiments illustrated in the appended drawings.

It is to be noted, however, that the appended drawings illustrate only typical embodiments of this invention and are therefore not to be considered limiting of its scope, for the disclosure may admit to other equally effective embodiments.

DETAILED DESCRIPTION

Figure 1:
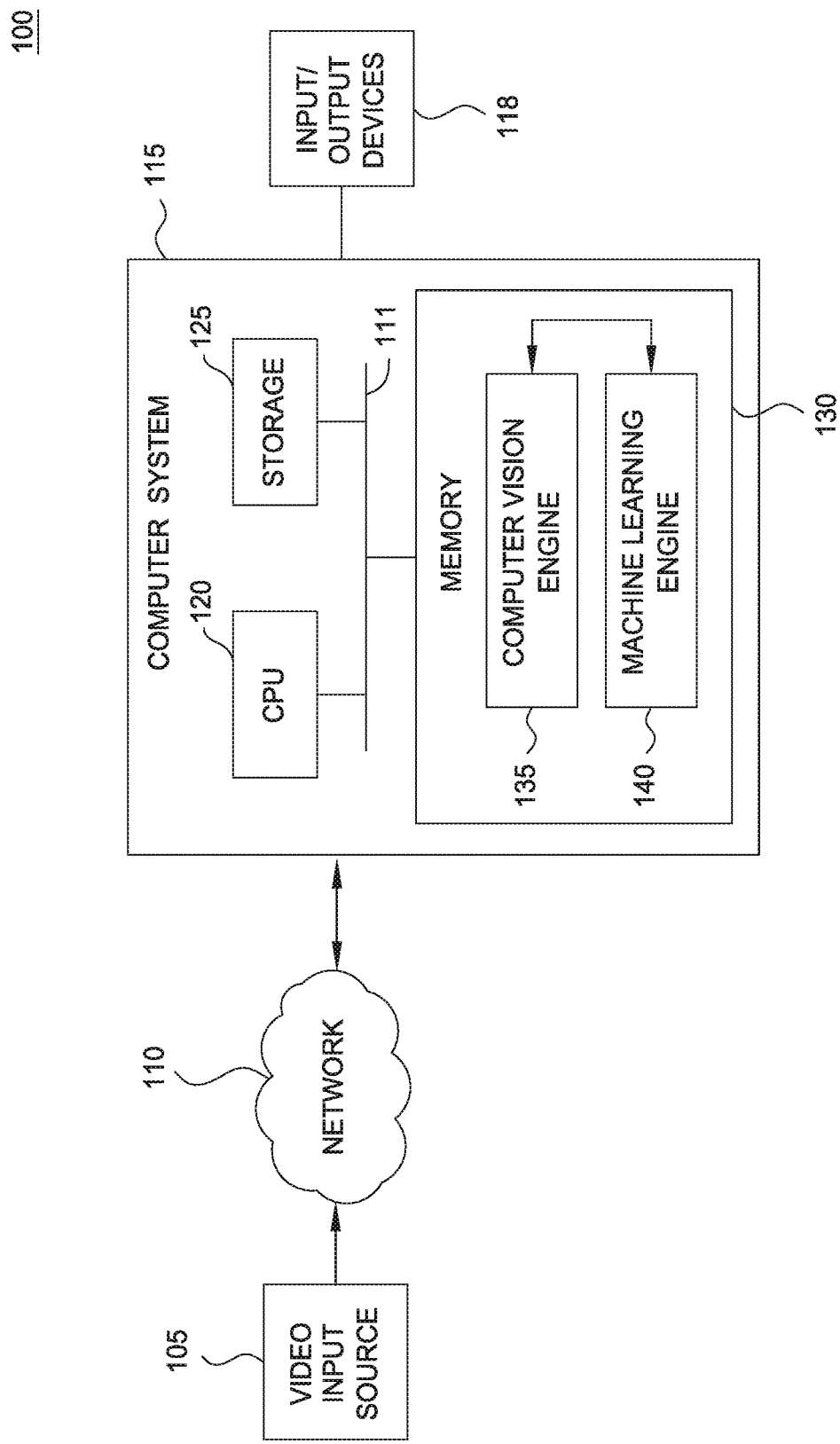
FIG. 1 illustrates components of a video analysis system, according to one embodiment.

Embodiments of the invention disclosed herein provide a framework for normalizing the number of alerts generated from multiple disjoint alert types in a behavioral recognition system. The disclosed framework provides statistical consistency to different alert types and ensures that the behavioral recognition system presents a relatively certain number of alerts to the user regardless of the number of alert types available in the system.

A behavioral recognition system may be configured to learn, identify, and recognize patterns of behavior by observing a sequence of individual frames, otherwise known as a video stream. Unlike a rules-based video surveillance system, which contains predefined patterns of what to identify, the behavioral recognition system disclosed herein learns patterns by generalizing input and building memories of what is observed. Over time, the behavioral recognition system uses these memories to distinguish between normal and anomalous behavior within the field of view captured within a video stream. Generally, the field of view is referred to as the "scene."

In one embodiment, the behavioral recognition system includes a computer vision engine and a machine learning engine. The computer vision engine may be configured to process a scene, generate information streams of observed activity, and then pass the streams to the machine learning engine. In turn, the machine learning engine may be configured to learn object behaviors in that scene, build models of certain behaviors within a scene, and determine whether observations indicate that the behavior of an object is anomalous, relative to the model.

In one embodiment, the machine learning engine may support multiple alert types triggered by a variety of different behavioral pattern categories, such as activity, motion, speed, velocity, and trajectory. Similarly, other alert types may depend on interactions between objects, including collision and position. Alert types learn normal behaviors in the scene and generate alerts on abnormal activities. A rules-based video surveillance system notifies a user to anomalies that the user specifies, while a behavioral recognition system notifies a user to whatever the system identifies as anomalous.

However, a behavioral recognition system may generate a large volume of alerts. Additionally, a behavioral system may include a large variety of alert types, and occurrences of one alert type may arise at a different frequency from occurrences of another alert type. Although there are some similarities in alerts at an abstract level, alert types are mostly disjoint in their behavioral recognition characteristics. For instance, the anomaly model of a high velocity alert type may differ greatly from a model of a high acceleration alert type. Further, given the relative occurrence rate of each alert type, the distribution of rare alerts will differ across alert types.

Therefore, to avoid the overall number of alerts from overwhelming a user, and to select which alerts to publish, a behavioral recognition system may be configured with an alert normalization module. In one embodiment, a user may provide a desired alert publication rate and a set of relative weights for the alert types supported by the system. In another embodiment, a user may also provide a desired dispatch rate. Alert publication generally refers to the behavioral recognition system publishing an alert to an interface, where it may be viewed and acted upon by an operator, and alert dispatch generally refers to the behavioral alert system notifying the user of an alert, e.g., by sending e-mail or by a generating display on a graphical user interface. For example, a user may specify to the behavioral recognition system to publish one hundred alerts per day, distributed with equal relative weights across alert types. In such a case, the alert normalization module may evaluate a distribution of previously published alerts, e.g., over the last seven days, for each alert type to identify a distribution for each alert type. Once the distribution is determined, a normalized rareness threshold, expected to result in the correct number of alerts for that type, may be calculated. The alert normalization module may use these threshold values in determining which alerts to present to the user.

In one embodiment, the machine learning engine processes information from observations made by the computer vision engine. For example, a camera focused on a parking lot may record cars passing through the scene, and the machine learning engine may process events corresponding to cars passing through the scene for alert types such as high speed, low speed, and abnormal trajectory. For each event, the machine learning engine assigns a rareness value for each alert type. The machine learning engine may discard alerts with a rareness value that falls below a threshold. In turn, the machine learning engine may generate an alert for alert types with a high rareness values (i.e., those greater than a threshold) as alerts through the alert normalization module.

The normalization module receives an alert from the machine learning engine and converts the alert's rareness value into an alert percentile. An alert percentile is a value that is based on an alert's rareness value compared to the rareness values of historical alerts of that alert type. Once the normalization module converts the rareness value into an alert percentile, the normalization module compares the alert percentile to a percentile threshold value and discards the alert if the percentile value falls below the threshold. If the percentile value is above the threshold, then the normalization module converts the percentile value into a normalized alert rareness value. This value is placed into a composite normalized rareness histogram that provides the module with data to assign a numerical publication rank for the alert. After assigning a rank to the alert, the normalization module publishes the alert with the rank value. For example, a behavioral recognition system configured to publish one hundred alerts per day publishes an unusual trajectory alert of rank twelve.

In the following, reference is made to embodiments of the invention. However, it should be understood that the invention is not limited to any specifically described embodiment. Instead, any combination of the following features and elements, whether related to different embodiments or not, is contemplated to implement and practice what is disclosed. Furthermore, in various embodiments the present invention provides numerous advantages over the prior art. However, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s). Likewise, any reference to "the invention" or "the disclosure" shall not be construed as a generalization of any inventive subject matter disclosed herein and shall not be considered to be an element or limitation of the appended claims except where explicitly recited in a claim(s).

One embodiment of the present invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present disclosure, are embodiments of the present disclosure. Other examples media include communications media through which information is conveyed to a computer, such as through a computer or telephone network, including wireless communications networks.

In general, the routines executed to implement the embodiments of the present disclosure may be part of an operating system or a specific application, component, program, module, object, or sequence of instructions. The computer program of the present disclosure is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the disclosure. However, it should be appreciated that any particular program nomenclature that follows is used merely for convenience, and thus the invention should not be limited to use solely in any specific application identified and/or implied by such nomenclature.

FIG. 1 illustrates components of a video analysis and behavioral recognition system 100, according to one embodiment of the present invention. As shown, the behavioral recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine learning engine 140. As described in greater detail below, the computer vision engine 135 and the machine learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area within the camera's field of view is referred to as the scene. The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

As noted above, the computer vision engine 135 may be configured to analyze this raw information to identify active objects in the video stream, identify a variety of appearance and kinematic features used by a machine learning engine 140 to derive object classifications, derive a variety of metadata regarding the actions and interactions of such objects, and supply this information to the machine learning engine 140. And in turn, the machine learning engine 140 may be configured to evaluate, observe, learn and remember details regarding events (and types of events) that transpire within the scene over time.

In one embodiment, the machine learning engine 140 receives the video frames and the data generated by the computer vision engine 135. The machine learning engine 140 may be configured to analyze the received data, cluster objects having similar visual and/or kinematic features, build semantic representations of events depicted in the video frames. Over time, the machine learning engine 140 learns expected patterns of behavior for objects that map to a given cluster. Thus, over time, the machine learning engine learns from these observed patterns to identify normal and/or abnormal events. That is, rather than having patterns, objects, object types, or activities defined in advance, the machine learning engine 140 builds its own model of what different object types have been observed (e.g., based on clusters of kinematic and or appearance features) as well as a model of expected behavior for a given object type. Thereafter, the machine learning engine can decide whether the behavior of an observed event is anomalous or not based on prior learning.

Data describing whether a normal/abnormal behavior/event has been determined and/or what such behavior/event is may be provided to output devices 118 to issue alerts, for example, an alert message presented on a GUI interface screen. Further, output devices 118 may be configured to allow a user to specify the amount of alerts to publish over a given time period. For example, a user may use a GUI interface to configure the behavioral recognition system 100 to publish 100 alerts per day.

In general, the computer vision engine 135 and the machine learning engine 140 both process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames. In other words, while the computer vision engine 135 may analyze each frame in real-time to derive a set of kinematic and appearance data related to objects observed in the frame, the machine learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 140 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application 250 running on another computer system may request (or receive) the results over network 110.

Figure 2:
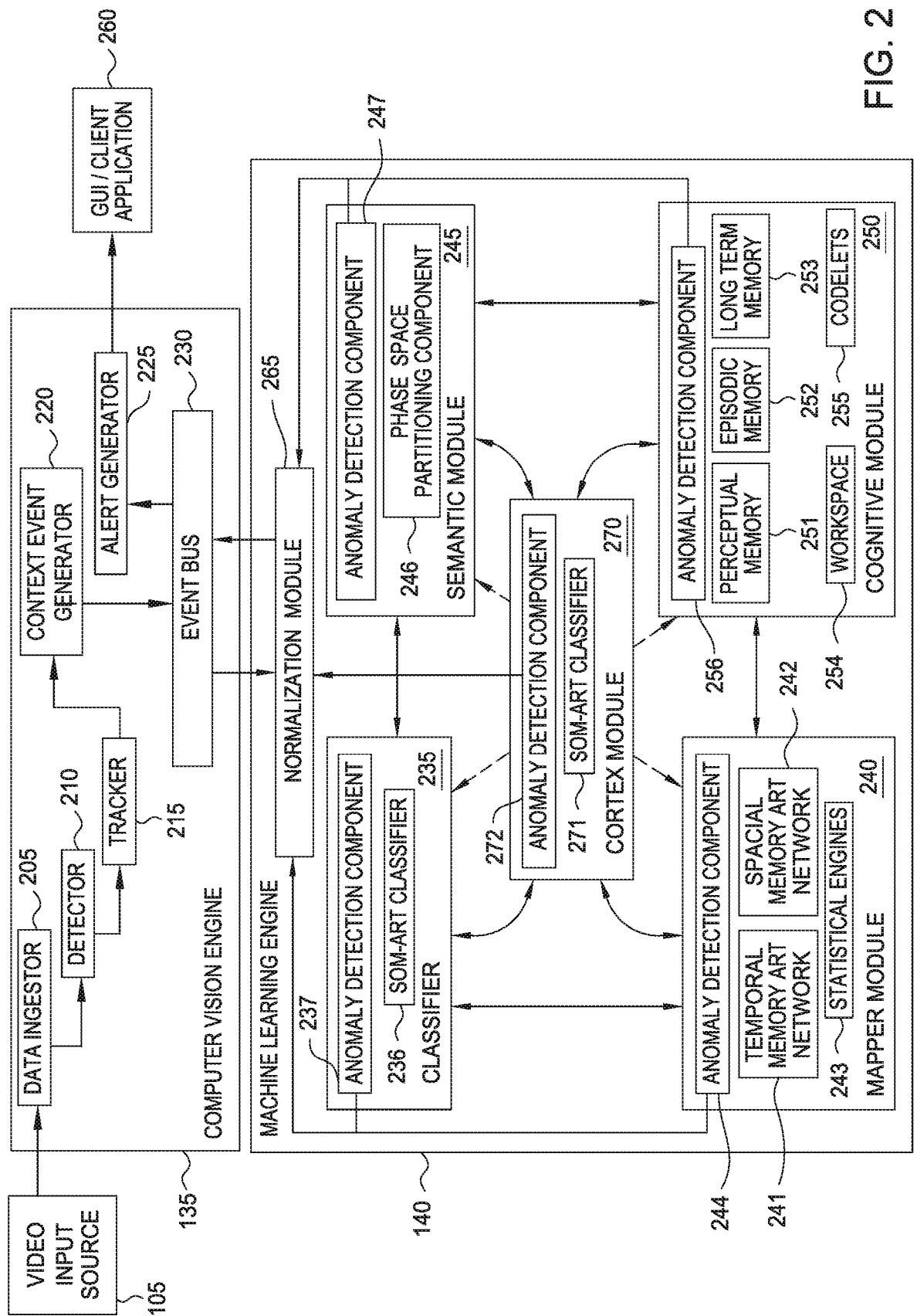
FIG. 2 further illustrates components of the video analysis system shown in FIG. 1, according to one embodiment.

FIG. 2 further illustrates components of the computer vision engine 135 and the machine learning engine 140 first illustrated in FIG. 1, according to one embodiment of the invention. As shown, the computer vision engine 135 includes a data ingestor 205, a detector 215, a tracker 215, a context event generator 220, an alert generator 225, and an event bus 230. Collectively, the components 205, 210, 215, and 220 provide a pipeline for processing an incoming sequence of video frames supplied by the video input source 105 (indicated by the solid arrows linking the components). In one embodiment, the components 210, 215, and 220 may each provide a software module configured to provide the functions described herein. Of course, one of ordinary skill in the art will recognize that the components 205, 210, 215, and 220 may be combined (or further subdivided) to suit the needs of a particular case and further that additional components may be added (or some may be removed) from a video surveillance system.

In one embodiment, the data ingestor 205 receives video input from the video input source 105. The data ingestor 205 may be configured to preprocess the input data before sending it to the detector 210. The detector 210 may be configured to separate each frame of video provided into a stationary or static part (the scene background) and a collection of volatile parts (the scene foreground). The frame itself may include a two-dimensional array of pixel values for multiple channels (e.g., RGB channels for color video or grayscale channel or radiance channel for black and white video). In one embodiment, the detector 210 may model background states for each pixel using an adaptive resonance theory (ART) network. That is, each pixel may be classified as depicting scene foreground or scene background using an ART network modeling a given pixel. Of course, other approaches to distinguish between scene foreground and background may be used.

Additionally, the detector 210 may be configured to generate a mask used to identify which pixels of the scene are classified as depicting foreground and, conversely, which pixels are classified as depicting scene background. The detector 210 then identifies regions of the scene that contain a portion of scene foreground (referred to as a foreground "blob" or "patch") and supplies this information to subsequent stages of the pipeline. Additionally, pixels classified as depicting scene background may be used to generate a background image modeling the scene.

In one embodiment, the detector 210 may be configured to detect the flow of a scene. Once the foreground patches have been separated, the detector 210 examines, from frame-to-frame, any edges and corners of all foreground patches. The detector 210 will identify foreground patches moving in a similar flow of motion as most likely belonging to a single object or a single association of motions and send this information to the tracker 215.

The tracker 215 may receive the foreground patches produced by the detector 210 and generate computational models for the patches. The tracker 215 may be configured to use this information, and each successive frame of raw-video, to attempt to track the motion of an object depicted by a given foreground patch as it moves about the scene. That is, the tracker 215 provides continuity to other elements of the system by tracking a given object from frame-to-frame. It further calculates a variety of kinematic and/or appearance features of a foreground object, e.g., size, height, width, and area (in pixels), reflectivity, shininess rigidity, speed velocity, etc.

The context event generator 220 may receive the output from other stages of the pipeline. Using this information, the context processor 220 may be configured to generate a stream of context events regarding objects tracked (by tracker component 210). For example, the context event generator 220 may package a stream of micro feature vectors and kinematic observations of an object and output this to the machine learning engine 140, e.g., at a rate of 5 Hz. In one embodiment, the context events are packaged as a trajectory. As used herein, a trajectory generally refers to a vector packaging the kinematic data of a particular foreground object in successive frames or samples. Each element in the trajectory represents the kinematic data captured for that object at a particular point in time. Typically, a complete trajectory includes the kinematic data obtained when an object is first observed in a frame of video along with each successive observation of that object up to when it leaves the scene (or becomes stationary to the point of dissolving into the frame background). Accordingly, assuming computer vision engine 135 is operating at a rate of 5 Hz, a trajectory for an object is updated every 200 milliseconds, until complete. The context event generator 220 may also calculate and package the appearance data of every tracked object by evaluating the object for various appearance attributes such as shape, width, and other physical features and assigning each attribute a numerical score.

The computer vision engine 135 may take the output from the components 205, 210, 215, and 220 describing the motions and actions of the tracked objects in the scene and supply this information to the machine learning engine 140 through the event bus 230. Illustratively, the machine learning engine 140 includes a classifier 235, a semantic module 240, a mapper 245, cognitive module 250, a cortex module 270, and a normalization module 265.

The classifier 235 receives context events such as appearance data from the computer vision engine 135 and maps the data on a neural network. In one embodiment, the neural network is a combination of a self-organizing map (SOM) and an ART network, shown in FIG. 2 as a SOM-ART network 236. The data is clustered and combined by features occurring repeatedly in association with each other. Then, based on those recurring types, the classifier 235 defines types of objects. For example, the classifier 235 may define foreground patches that have, for example, a high shininess rigidity and reflectivity as a Type 1 object. These defined types then propagate throughout the rest of the system.

The cortex module 270 receives kinematic data from the computer vision engine 135 and maps the data on a neural network, shown in FIG. 2 as SOM-ART network 271. In one embodiment, SOM-ART network 271 clusters kinematic data to build common sequences of events in a scene. In another embodiment, SOM-ART network 271 clusters kinematic data from interacting trajectories to build common interactions in a scene. By learning common sequences of events and interactions within the scene, the cortex module 270 aids the machine learning engine in detecting anomalous sequences and interactions.

The mapper 240 uses these types by searching for spatial and temporal correlations and behaviors across the system for foreground patches to create maps of where and when events are likely or unlikely to happen. In one embodiment, the mapper 240 includes a temporal memory ART network 241, a spatial memory ART network 242, and statistical engines 243. For example, the mapper 240 may look for patches of Type 1 objects. The spatial memory ART network 242 uses the statistical engines 243 to create statistical data of these objects, such as where in the scene do these patches appear, in what direction do these patches tend to go, how fast do these patches go, whether these patches change direction, and the like. The mapper 240 then builds a neural network of this information, which becomes a memory template against which to compare object behaviors. The temporal memory ART network 241 uses the statistical engines 243 to create statistical data based on samplings of time slices. In one embodiment, initial sampling occurs at every thirty minute interval. If many events occur within a time slice, then the time resolution may be dynamically changed to a finer resolution. Conversely, if fewer events occur within a time slice, then the time resolution may be dynamically changed to a coarser resolution.

In one embodiment, the semantic module 245 includes a phase space partitioning component 246 and an anomaly detection component 247. The semantic module 245 identifies patterns of motion or trajectories within a scene and analyzes the scene for anomalous behavior through generalization. By tessellating a scene and dividing the foreground patches into many different tessera, the semantic module 245 traces an object's trajectory and learns patterns from the trajectory. The semantic module 245 analyzes these patterns and compares them with other patterns. As objects enter a scene, the phase space partitioning component 246 builds an adaptive grid and maps the objects and their trajectories onto the grid. As more features and trajectories are populated onto the grid, the machine learning engine learns trajectories that are common to the scene and further distinguishes normal behavior from anomalous behavior.

In one embodiment, the cognitive module 250 includes a perceptual memory 251, an episode memory 252, a long term memory 253, a workspace 254, and codelets 255. Generally, the workspace 254 provides a computational engine for the machine learning engine 140. For example, the workspace 240 may be configured to copy information from the perceptual memory 251, retrieve relevant memories from the episodic memory 252 and the long-term memory 253, select which codelets 255 to execute. In one embodiment, each codelet 255 is a software program configured to evaluate different sequences of events and to determine how one sequence may follow (or otherwise relate to) another (e.g., a finite state machine). More generally, the codelet may provide a software module configured to detect interesting patterns from the streams of data fed to the machine learning engine. In turn, the codelet 255 may create, retrieve, reinforce, or modify memories in the episodic memory 252 and the long-term memory 253. By repeatedly scheduling codelets 255 for execution, copying memories and percepts to/from the workspace 240, the machine learning engine 140 performs a cognitive cycle used to observe, and learn, about patterns of behavior that occur within the scene.

In one embodiment, the perceptual memory 251, the episodic memory 252, and the long-term memory 253 are used to identify patterns of behavior, evaluate events that transpire in the scene, and encode and store observations. Generally, the perceptual memory 251 receives the output of the computer vision engine 135 (e.g., a stream of context events). The episodic memory 252 stores data representing observed events with details related to a particular episode, e.g., information describing time and space details related on an event. That is, the episodic memory 252 may encode specific details of a particular event, i.e., "what and where" something occurred within a scene, such as a particular vehicle (car A) moved to a location believed to be a parking space (parking space 5) at 9:43 AM.

In contrast, the long-term memory 253 may store data generalizing events observed in the scene. To continue with the example of a vehicle parking, the long-term memory 253 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 253 stores observations about what happens within a scene with much of the particular episodic details stripped away. In this way, when a new event occurs, memories from the episodic memory 252 and the long-term memory 253 may be used to relate and understand a current event, i.e., the new event may be compared with past experience, leading to both reinforcement, decay, and adjustments to the information stored in the long-term memory 253, over time. In a particular embodiment, the long-term memory 253 may be implemented as an ART network and a sparse-distributed memory data structure. Importantly, however, this approach does not require the different object type classifications to be defined in advance.

In one embodiment, modules 235, 240, 245, 250, and 270 include an anomaly detection component, as depicted by components 237, 244, 247, 256, and 272. Each module may be configured to identify anomalous behavior, relative to past observations of the scene. If any module identifies anomalous behavior, its corresponding anomaly detector component generates an alert and passes the alert through the normalization module 265. For instance, anomaly detector 247 in the semantic module 245 detects unusual trajectories using learned patterns and models. If a foreground object exhibits loitering behavior, for example, anomaly detector 247 evaluates the object trajectory using loitering models, subsequently generates an alert, and sends the alert to the normalization module 265. Upon receiving an alert, the normalization module 265 evaluates whether the alert should be published.

Figure 3:
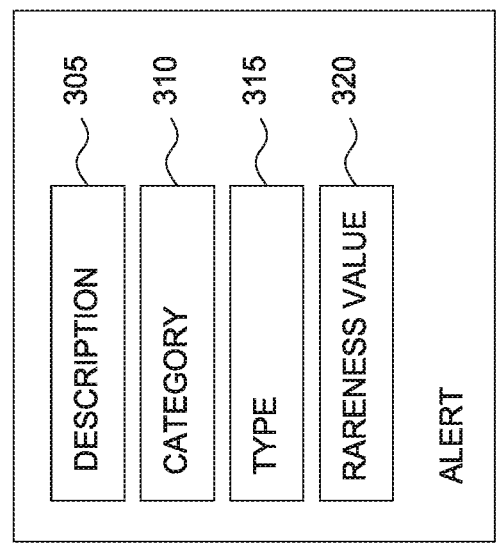
FIG. 3 illustrates an alert that a behavioral recognition system may generate, according to one embodiment.

FIG. 3 illustrates an example alert 300 generated by the behavioral recognition system, according to one embodiment. As shown, the alert 300 includes a description 305, category 310, a type 315, and a rareness value 320. Of course, an alert may include additional data. The description 305 may include information about the alert, such as when the event occurred (i.e. relative to a time index of a scene) and where the event occurred (i.e., relative to the coordinates of a foreground object in a scene) or how long the event took place. The category 310 is an identifier that corresponds to a behavioral pattern. Velocity, trajectory, and motion are all examples of alert categories. A type 315 corresponds to an alert type. High velocity, sequence trajectory, and anomalous motion are all examples of alert types.

In one embodiment, a rareness value 320 ranges between 0 and 1 and reflects how common the occurrence is relative to past occurrences corresponding to a certain alert type. A value of 0 represents the most common (or least rare) event, while a value of 1 represents the least common (or rarest) event. The machine learning engine assigns rareness values for each alert type to all occurrences observed by the behavioral recognition system. In a behavioral recognition system that is newly deployed, the machine learning engine may initially assign high rareness values to events in a scene (because the machine learning engine is processing information on newly observed behavioral patterns), but over time, the machine learning engine assigns rareness values more accurately after learning more behavioral patterns.

Figure 4:
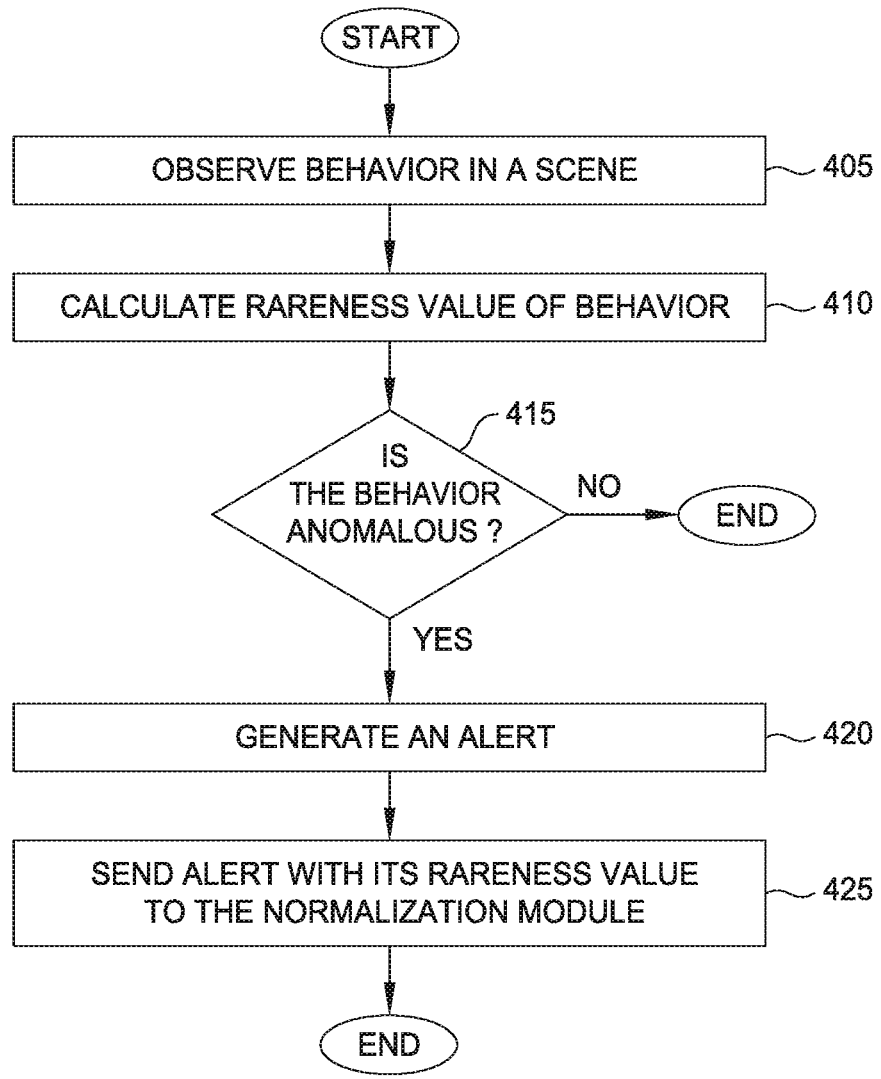
FIG. 4 illustrates a method for processing alerts within a behavioral recognition system configured with a normalization module, according to one embodiment.

FIG. 4 illustrates a method 400 for processing alerts within a behavioral recognition system configured with an alert normalization module, according to one embodiment. The method begins at step 405, where the computer vision engine processes an event in a scene and sends the information (e.g., appearance and kinematics data of the foreground object) to the machine learning engine. For example, a camera focused a parking garage may record a car driving at a speed of thirty-five miles per hour. The computer vision engine generates information, such as data of the car's trajectory and speed, and passes it to the machine learning engine. At step 410, the machine learning assigns the behavior a rareness value to each alert type. In this example, because the machine learning engine typically evaluates cars (i.e., a classification model representing a car) moving at a speed of ten miles per hour through the scene, the system may assign a rareness value of 0.85 to a high speed alert type. At step 415, the machine learning engine determines whether the event corresponds to anomalous behavior (e.g., through one of the machine learning engine's anomaly detection components). If not, the system discards the event. Otherwise, if the event is anomalous, then the system generates an alert for the event at step 420. The machine learning engine sends the alert with its rareness value to the normalization module. In the ongoing example, the machine learning engine passes the observation of the car driving at thirty-five miles per hour as an alert through the normalization module if the system finds such behavior anomalous.

Figure 5:
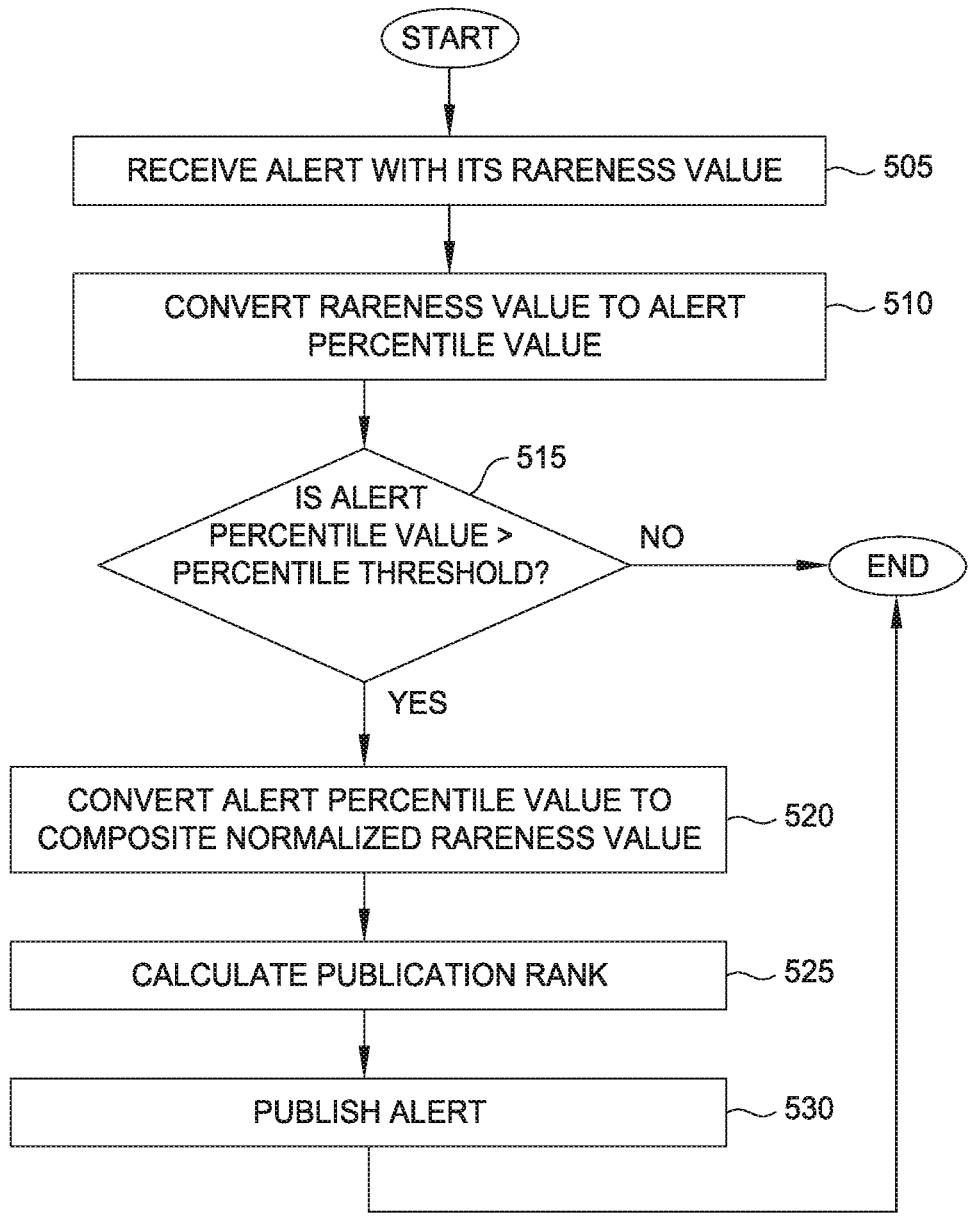
FIG. 5 illustrates a method for publishing a normalized alert, according to one embodiment.

FIG. 5 illustrates a method 500 for normalizing and publishing an alert in a behavioral recognition system. For this method, presume that a user has specified to the normalization module a maximum publication rate (i.e., a number of alerts to publish per day) and a set of relative weights per alert type. As shown, the method begins at step 505, where the normalization module receives an alert from an anomaly detection component in the machine learning engine. For example, the anomaly detection component in the semantic module may generate an unusual trajectory alert and send it to the normalization module. At step 510, the normalization module converts the alert's rareness value to an alert percentile value.

After calculating the alert percentile, at step 515, the normalization module evaluates whether the alert percentile is greater than a percentile threshold. The percentile threshold is calculated using a value for the normalization module's maximum allowed alert counts for an alert type and an estimated value for alert counts of the next day. In one embodiment, the maximum allowed alert counts for an alert type$_i$, represented in the following equation as $v_i$, may be determined as follows:

$$v_i = \frac{\omega_i P}{\sum_{i=1}^{M} \omega_i}, \qquad (1)$$

where $\omega_i$ represents the relative publication weight given for that alert type, P represents the desired publication rate, and M represents the total number of alert types in the behavioral recognition system. Further, in one embodiment, the value for alert counts of the next day, represented in the following equation as may be estimated as follows:

$$N_i = \frac{\sum_{k=1}^{B} \alpha_k n_k}{\sum_{k=1}^{B} \alpha_k}, \qquad (2)$$

where B represents a historical buffer (in days), $n_k$ represents alert counts observed on the $k^{th}$ day in the past, and $\alpha$ represents a set of relative weights for each daily alerts count in the historical buffer. Using the maximum allowed volume for an alert type and the next-day alert counts value, the percentile threshold, represented in the following equation as $\xi_i$, may be calculated as follows:

$$\xi_i = 1 - \frac{v_i}{N_i}. \qquad (3)$$

In one embodiment, the normalization module updates the percentile threshold on a daily basis using historical alert percentile values.

Upon determining whether an alert percentile is greater than the percentile threshold (step 515), the normalization module converts the alert percentile value to a composite normalized rareness value. The normalization module does this by estimating the rareness of the alert relative to its own distribution within the alert type. In one embodiment, a normalized rareness value, represented here as $\eta_i$, may be obtained through this formula:

$$\eta_i = \frac{\varepsilon_i - \xi_i}{1 - \xi_i}, \qquad (4)$$

where $\varepsilon_i$ represents the alert percentile value. This approach ensures statistical consistency across values of multiple disjoint alert types. For example, a normalized rareness value of 0.9 for alerts of two different alert types have the same statistical rarity and may be regarded as having the same importance despite their underlying anomaly models being different.

The normalization module populates the normalized rareness value of the alert into a composite normalized rareness histogram. The composite normalized rareness histogram provides the normalization module with data to create a publication rank for the alert. Using this data and the given publication and dispatch rates, the normalization module computes the alert's publication rank (step 525). In one embodiment, the equation to calculate a certain publication rank $\beta$ for a given alert i is as follows:

$$\beta = \min(P, N_p) * (1 - \eta_i) \qquad (5),$$

where $N_P$ is a rank-renormalization constant that is estimated by computing the maximum value of historical daily-published alerts for the last B number of days. Alerts with high normalized rareness values have a lower publication rank than alerts with low values. The normalization module publishes the alert in order of publication rank (step 530). In another embodiment, a user may configure the alert normalization module to dispatch (e.g., by sending e-mail or by generating display on a graphical user interface) a certain number of alerts. In such a case, the normalization module dispatches the alert only if the publication rank is less than the maximum dispatch number.

The normalization module is unable to normalize the alert using equation (4) in cases where the alert's original rareness value is equal to 1. Instead, in one embodiment, $\eta_i$ may be obtained through this formula:

$$\eta_i = 1 - \mathrm{rand}\,\frac{m + \sum_{k=1}^{B} m_k}{p + \sum_{k=1}^{B} p_k} \quad \text{if } r = 1, \qquad (6)$$

where rand(x) denotes a uniform random number in [0,x], m is a current number of alerts having a rareness value of 1 observed for the day, p is a current number of published alerts for the day, and r is the alert's original rareness value.

In another embodiment, the normalization module may calculate $N_i$ to account for differing alert type volumes on specific days of the week. For example, the machine learning engine may, on a weekly basis, consistently generate more alerts on a Friday than on a Monday, and a user may want the normalization module to estimate the total number of counts for a given day using the counts of that day a week ago. To handle day-specific normalization, $N_i$ may be calculated as:

$$N_i = \theta \frac{\sum_{i=1}^{B} \alpha_i \gamma_i}{\sum_{i=1}^{B} \alpha_i} + (1-\theta) \frac{\sum_{i=1}^{B} \omega_{id}}{B}, \quad (7)$$

where $\theta$ is a multiplier that represents the weight given to daily composites, $\gamma$ represents the number of object-specific composites observed for the current day, and d represents the day for which the count needs to be estimated.

Further, in another embodiment, the normalization module adjusts the percentile threshold value in cases of alert overshoot. Alert overshoot occurs in situations where the behavioral recognition system observes more anomalous events in a day than anticipated, resulting in a lower than percentile threshold and thus more alerts crossing the threshold value. The normalization module adapts to this by increasing the percentile threshold toward 1 using an overage value $\lambda$. In one embodiment, the adjustment is represented in the following formula:

$$\xi_i = \frac{N_i + p_i - (1-\lambda)v_i}{N_i} \text{ if } p_i > v_i, \quad (8)$$

where $p_i$ represents the number of published alerts for the current day. Note, however, that the normalization module does not modify the percentile threshold if the number of published alerts falls below the maximum number of volume of alerts allowed by the system for that alert type, and further note that the normalization module places an upper bound on the number of alerts that any alert type can publish.

Figure 6:
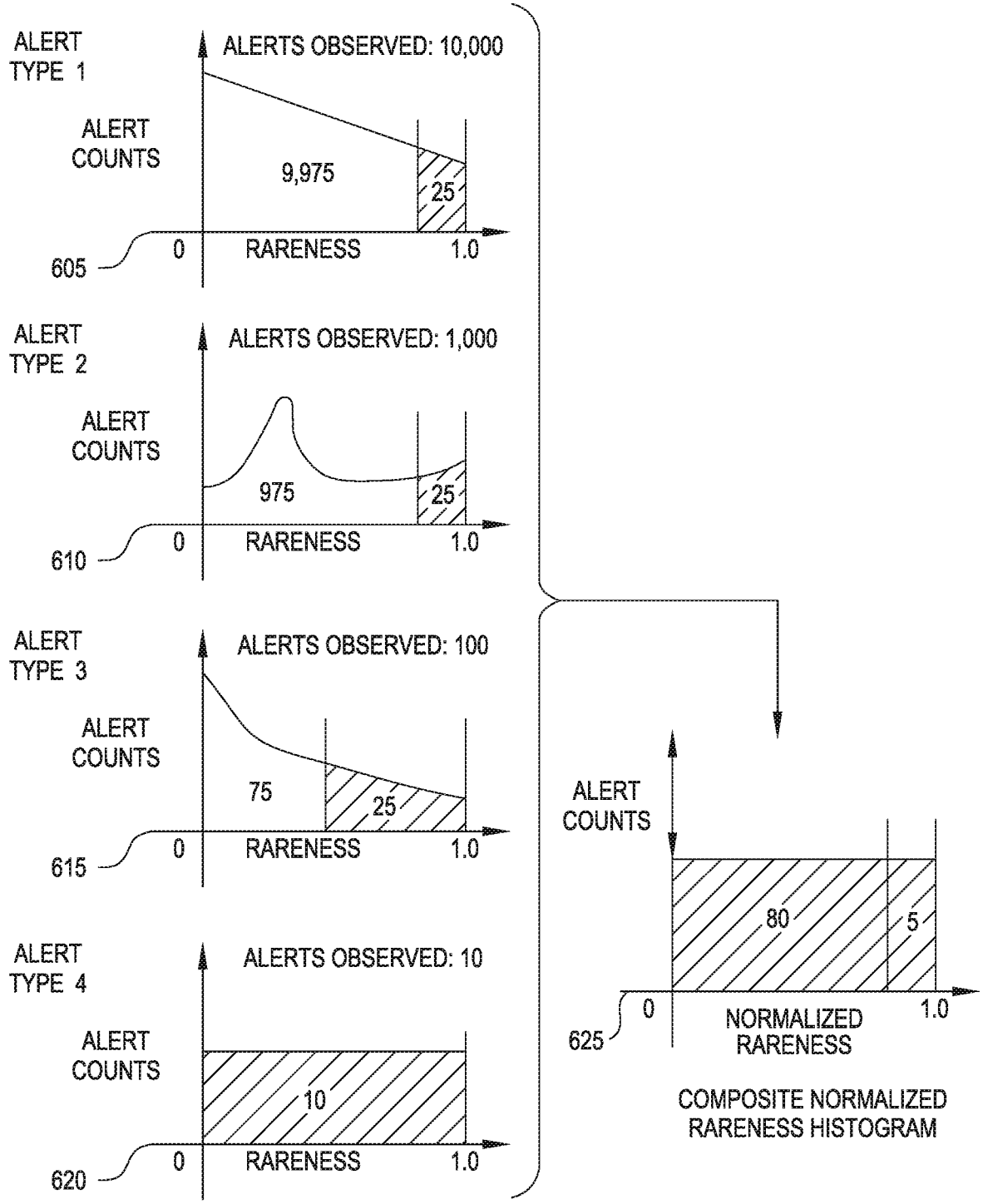
FIG. 6 illustrates graphical representations of an example specific use case of an alert normalization module in a behavioral recognition system, according to one embodiment.

FIG. 6 illustrates a graphical representation of an example specific use case of the alert normalization module. For the purpose of this example case, a user sets a desired publication rate of 100 alerts per day, a desired dispatch rate of five alerts per day, and equal relative weights for all alert types in a system where there are four overall alert types. The figure represents the publication and dispatch of alerts through the four alert types in a given day, where each alert type is expected to publish a maximum of twenty-five alerts. The graphs on the left side of the figure (605, 610, 615, and 620) show the representative distribution of alerts from all alert types. For simplicity, continuous distributions are shown here and the number of alerts observed within the day are considered to match exactly with the estimated next-day alerts based on the historical daily-alerts data. The lined portions of each graph represent alerts that will be published. Note that the top twenty-five alerts from the first three alert types with the highest original rareness values are published, as well as all ten of the alerts from the last alert type. The alerts that are not published do not satisfy the percentile threshold.

Note that all of the alerts to be published from the individual alert types are automatically uniformly distributed with their normalized rareness values across the composite normalized rareness histogram 625, displayed on the right side of the figure. The normalization module uses data in the histogram to calculate the publication ranks of the alerts to be published. In one embodiment, the computed rank is further used to decide if any particular alert should be dispatched. More specifically, all eighty-five alerts coming from individual alert types are published with publication ranks between 0 and 85. Further note that the smaller the rank, the more importance the published alert has, and thus the normalization module will dispatch all alerts below the desired dispatch rate, in this case alerts with a rank of below 5.

As described, embodiments of the present invention provide a framework for normalizing the number of alerts generated for multiple disjoint alert types in a behavioral recognition-based video surveillance system. By using a desired alert publication rate and relative weights of different alert types, a normalization module receives an alert having a certain rareness value and converts this value to a percentile. If the percentile is greater than a threshold value, then the module normalizes the alert and publishes the alert to the user. Advantageously, this approach brings statistical consistency across rareness values of different alert types and ensures the publication of a relatively certain number of alerts regardless of the number of alert types within the system.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   learning, at a machine learning engine of a computer system, a plurality of patterns of a machine learning model;
   receiving, at a computer vision engine of the computer system, a video stream including a plurality of frames;
   analyzing, via the machine learning engine of the computer system, each frame from the plurality of frames to detect an anomalous behavior based on the machine learning model;
   generating, via the machine learning engine, an alert message based on the detected anomalous behavior, the alert message including a representation of an alert type and a representation of a rareness score;
   determining, via the machine learning engine and based on a rank-renormalization constant, a publication rank associated with the alert message, the rank-renormalization constant computed based on historical alerts; and
   causing publication, based on the publication rank, of the alert message and the publication rank when the publication rank is less than a predefined maximum number of publications.

2. The method of claim 1, wherein the video stream is processed by the computer system in real-time.

3. The method of claim 1, further comprising identifying, via the computer vision engine, an active object of a scene associated with the video stream.

4. The method of claim 1, further comprising identifying, via the computer vision engine, an active object of a scene associated with the video stream, the analyzing each frame from the plurality of frames to detect the anomalous behavior further based on metadata derived by the computer vision engine in response to the identifying the active object.

5. The method of claim 1, wherein the analyzing each frame from the plurality of frames to detect the anomalous behavior includes clustering objects from each said frame based on at least one of visual similarity or kinematic similarity.

6. The method of claim 1, wherein the analyzing each frame from the plurality of frames to detect the anomalous behavior includes clustering objects from each said frame, the method further comprising:
 determining an expected behavior pattern for objects that map to a cluster; and
 updating the machine learning model to identify the expected behavior pattern as normal.

7. The method of claim 1, further comprising receiving, at the computer system, a user input including alert configuration data.

8. The method of claim 1, wherein the rank-renormalization constant is a maximum value of the historical alerts over a predefined time period.

9. A non-transitory computer-readable storage medium storing processor-executable instructions to:
 learn, at a machine learning engine of a computer system, a plurality of patterns of a machine learning model;
 receive, at a computer vision engine of the computer system, a video stream including a plurality of frames;
 analyze, via a machine learning engine of the computer system, each frame from the plurality of frames to detect an anomalous behavior based on the machine learning model;
 generate, via the machine learning engine, an alert message based on the detected anomalous behavior, the alert message including a representation of an alert type and a representation of a rareness score;
 determine, via the machine learning engine and based on a rank-renormalization constant, a publication rank associated with the alert message, the rank-renormalization constant computed based on historical alerts; and
 cause publication, based on the publication rank, of the alert message and the publication rank when the publication rank is less than a predefined maximum number of publications.

10. The non-transitory computer-readable storage medium of claim 9, further storing processor-executable instructions to receive, at the computer system, a user input including alert configuration data.

11. The non-transitory computer-readable storage medium of claim 9, further storing processor-executable instructions to identify, via the computer vision engine, an active object of a scene associated with the video stream.

12. The non-transitory computer-readable storage medium of claim 9, further storing processor-executable instructions to identify, via the computer vision engine, an active object of a scene associated with the video stream, based on metadata derived by the computer vision engine in response to the identifying the active object.

13. The non-transitory computer-readable storage medium of claim 9, wherein the processor-executable instructions are configured to cause the processor to analyze each frame from the plurality of frames to detect the anomalous behavior by clustering objects from each said frame based on at least one of visual similarity or kinematic similarity.

14. The non-transitory computer-readable storage medium of claim 9, wherein the processor-executable instructions are configured to cause the processor to analyze each frame from the plurality of frames to detect the anomalous behavior by clustering objects from each said frame, the medium further storing processor-executable instructions to:
 determine an expected behavior pattern for objects that map to a cluster; and
 update the machine learning model to identify the expected behavior pattern as normal.

15. A system, comprising:
 a processor; and
 a memory operably coupled to the processor and storing processor-executable instructions to:
  learn, at a machine learning engine of a computer system, a plurality of patterns of a machine learning model;
  receive, at a computer vision engine of the computer system, a video stream including a plurality of frames;
  analyze, via the machine learning engine of the computer system, each frame from the plurality of frames to detect an anomalous behavior based on the machine learning model of the machine learning engine of the computer system;
  generate, via the machine learning engine, an alert based on the detected anomalous behavior, the alert message including a representation of an alert type and a representation of a rareness score;
  determine, via the machine learning engine and based on a rank-renormalization constant, a publication rank associated with the alert message, the rank-renormalization constant computed based on historical alerts; and
  cause publication, based on the publication rank, of the alert message and the publication rank when the publication rank is less than a predefined maximum number of publications.

16. The system of claim 15, wherein the processor-executable instructions are configured to cause the processor to analyze each frame from the plurality of frames in real-time.

17. The system of claim 15, wherein the memory further stores processor-executable instructions to receive, at the computer system, a user input including alert configuration data.

18. The system of claim 15, wherein the memory further stores processor-executable instructions to identify, via the computer vision engine, an active object of a scene associated with the video stream.

19. The system of claim 15, wherein the memory further stores processor-executable instructions to identify, via the computer vision engine, an active object of a scene associated with the video stream, based on metadata derived by the computer vision engine in response to the identifying the active object.

20. The system of claim 15, wherein the processor-executable instructions are configured to cause the processor to analyze each frame from the plurality of frames to detect the anomalous behavior by clustering objects from each said frame based on at least one of visual similarity or kinematic similarity.

21. The system of claim 15, wherein the processor-executable instructions are configured to cause the processor to analyze each frame from the plurality of frames to detect the anomalous behavior by clustering objects from each said frame, the medium further storing processor-executable instructions to:
 determine an expected behavior pattern for objects that map to a cluster; and update the machine learning model to identify the expected behavior pattern as normal.

\* \* \* \* \*